US006873335B2

(12) United States Patent
Hall

(10) Patent No.: US 6,873,335 B2
(45) Date of Patent: Mar. 29, 2005

(54) GRAPHICS MEMORY SYSTEM FOR VOLUMERIC DISPLAYS

(75) Inventor: Deirdre M. Hall, Beverly, MA (US)

(73) Assignee: Actuality Systems, Inc., Burlington, MA (US)

( * ) Notice: Subject to any disclaimer, the term of this patent is extended or adjusted under 35 U.S.C. 154(b) by 160 days.

(21) Appl. No.: 09/947,947

(22) Filed: Sep. 6, 2001

(65) Prior Publication Data

US 2002/0070943 A1 Jun. 13, 2002

Related U.S. Application Data

(60) Provisional application No. 60/230,972, filed on Sep. 7, 2000.

(51) Int. Cl.[7] ............................................. G06F 12/06
(52) U.S. Cl. ...................... 345/572; 345/424; 345/539; 345/561
(58) Field of Search ................................. 345/501–506, 345/519–520, 522, 530–574, 424, 419, 420

(56) References Cited

U.S. PATENT DOCUMENTS

| | | | |
|---|---|---|---|
| 4,648,045 A | | 3/1987 | Demetrescu ................. 364/518 |
| 4,839,828 A | | 6/1989 | Elsner et al. ................ 364/518 |
| 5,226,113 A | * | 7/1993 | Cline et al. .................. 345/424 |
| 5,408,539 A | * | 4/1995 | Finlay et al. ................ 345/564 |
| 5,566,279 A | * | 10/1996 | Katayama ................... 345/419 |
| 5,572,691 A | * | 11/1996 | Koudmani ................... 345/573 |
| 5,574,836 A | | 11/1996 | Broemmelsiek ............ 395/127 |
| 5,590,249 A | * | 12/1996 | Hanaoka ..................... 395/122 |
| 5,854,613 A | * | 12/1998 | Soltan et al. ................. 345/32 |
| 6,064,423 A | * | 5/2000 | Geng .......................... 345/419 |
| 6,369,817 B1 | * | 4/2002 | Yamato et al. .............. 345/424 |
| 6,532,017 B1 | * | 3/2003 | Knittel et al. ............... 345/506 |

| | | | |
|---|---|---|---|
| 2002/0015007 A1 | * | 2/2002 | Perlin et al. .................... 345/6 |

FOREIGN PATENT DOCUMENTS

| | | | |
|---|---|---|---|
| EP | 0312 720 | 4/1989 | ............ G09G/1/16 |
| EP | 0525986 | * 3/1993 | ............ G09G/1/16 |
| EP | 0827 129 | 3/1998 | ............ G09G/3/34 |

OTHER PUBLICATIONS

David Ebert et al, "Realizing 3D Visualization using Crossed–Beam Volumetric Displays", Communications of the ACM, pp. 101–107, 8/99, vol. 42, No. 8.*
M. Halle, "Autostereoscopic displays and computer graphics", Computer GRaphics, 5/97.*
TENCON'94, IEEE region 10's Nonth Annual International Conf., "a graphics hierarchy for the visualisation of 3D images by means of a volumetric display system" by BG Blundell et al, Aug. 22–26, 1994, pp. 1–5.*
Engine Science and Education Journal, "Volumetric 3D display systems: their past, present and future" by BG Blundell et al, 10/93, pp. 196–200.*

* cited by examiner

*Primary Examiner*—Kee M. Tung
(74) *Attorney, Agent, or Firm*—Fish & Richardson P.C.

(57) ABSTRACT

A graphics memory system for managing image data for a volumetric display that displays volumetric images, the system including a first buffer memory with a first predefined address space for holding image data for a three-dimensional image; a second buffer memory with as second predefined address space for holding image data for a three-dimensional image, wherein the first and second predefined address spaces are the same; and a voxel router in communication with both the first and second buffer memories, wherein the voxel router is configured to use a selectable one of the first and second buffer memories as an active memory out of which stored image data is to be read for display on the volumetric display and to use the other of the first and second buffer memories as an inactive memory into which image data is to be written.

9 Claims, 4 Drawing Sheets

GRAPHICS MEMORY SYSTEM FOR VOLUMERIC DISPLAYS

Under 35 USC §119(e)(1), this application claims the benefit of prior U.S. provisional application 60/230,972, filed Sep. 7, 2000, the contents of which are incorporated herein by reference.

TECHNICAL FIELD

The invention relates generally to a graphics memory system for three-dimensional displays, and more particularly, for volumetric displays.

BACKGROUND

Volumetric displays are a class of three-dimensional display technology that produce volume-filling imagery. Typically, volumetric displays are autostereoscopic; that is, they produce imagery that appears three-dimensional without the use of additional eyewear.

Some volumetric displays create three-dimensional imagery by employing spatio-temporal multiplexing in emitting or scattering light from a range of locations within an image volume. In other words, a smaller number of light-generating devices (for example, lasers, projector pixels, etc.) are run at a higher frequency than an overall volumetric refresh rate, and the light is imaged onto a rotating surface. Persistence of vision integrates the image slices formed at different spatio-temporal locations of the volume swept by the rotating surface, and the viewer perceives a volume-filling, three-dimensional image.

The concept of a volumetric display in which three-dimensional imagery is perceived by visual integration of a series of images projected on a rotating screen has existed since, at least, the late 1950s. In 1958, Max Hirsch filed a patent application for a "generescope," wherein imagery formed on the surface of a cathode ray tube (CRT) is relayed by a periscope-like arrangement that images onto a rear-projection screen. In the generescope, the CRT, mirrors, and screen rotated in unison. The arrangement of rotating relay mirrors keeps the projection optical path length invariant with respect to the projection screen angle. For this, Hirsch was issued U.S. Pat. No. 2,967,905 in 1961.

A 1960 *Aviation Week* article entitled "New Display Gives Realistic 3-D Effect," (pp. 66–67, Oct. 31, 1960) describes a 3-D display developed by ITT Laboratories. It is similar to the display taught by Hirsch, in that a sequence of 2-D images formed on the surface of a CRT are relayed to a rotating projection screen by an arrangement of mirrors that rotate with the projection screen, thereby keeping the projection optical path length invariant with respect to the projection screen angle. However, the ITT display employs a stationary CRT and front-end optical components. One consequence of their architecture is that the CRT's image rotates in the plane of the projection screen as the projection screen rotates.

Other volumetric displays which employ similar radially-extended relay optics include the volumetric displays described by Batchko (U.S. Pat. No. 5,148,310) and Tsao et al. (U.S. Pat. Nos. 5,754,147 and 5,954,414). Batchko describes a volumetric display wherein a rotating screen is illuminated by a fixed, vector-scanned laser illumination source. Tsao and co-workers utilize a k-mirror system, which rotates at half of the screen's angular frequency, to prevent the image of the projector from rotating in the plane of the projection screen.

SUMMARY

In general, in one aspect, the invention features a graphics memory system for managing image data for a volumetric display that displays volumetric images. The system includes a first buffer memory with a first predefined address space for holding data for a three-dimensional image; a second buffer memory with a second predefined address space for holding data for a three-dimensional image, wherein the first and second predefined address spaces are the same; and a voxel router in communication with both the first and second buffer memories. The voxel router is configured to use a selectable one of the first and second buffer memories as an active memory out of which stored image data is to be read for display on the volumetric display and to use the other of the first and second buffer memories as an inactive memory into which image data is to be written.

Preferred embodiments of the invention may include one or more of the following features. The graphics memory system also includes an address generator in communication with the voxel router and the first and second buffer memories. The address generator generates addresses identifying locations within the predefined address spaces of the first and second buffer memories and is configured to cause the voxel router to select which of the first and second buffer memories is to be the active memory. Both of the first and second buffer memories are implemented by single ported memories, e.g. SDRAMs.

In general, in another aspect, the invention features a graphics memory system that includes a first buffer memory for holding data for a three-dimensional image; a second buffer memory for holding data for a three-dimensional image; a voxel router in communication with both the first and second buffer memories; and an address generator in communication with the voxel router and the first and second buffer memories. The voxel router is configured to use a selectable one of the first and second buffer memories as an active memory out of which stored image data is to be read for display on the volumetric display and to use the other of the first and second buffer memories as an inactive memory into which image data is to be written. During operation, the address generator generates addresses identifying locations within the predefined address spaces of the first and second buffer memories and is configured to respond to receiving a write block command by causing the voxel router to write new data to a block within the inactive memory at a location that is identified by an address supplied by the address generator.

Preferred embodiments may include one or more of the following features. The block is a 32-bit word. The address generator is further configured to respond to receiving the write block command by causing the voxel router to retrieve data that is stored in the identified block of inactive memory, to modify the retrieved data, and to write the modified data back to the inactive memory as the new data. The voxel router is also configured to modify the retrieved data by using a designated logical operation to combine the retrieved data with data supplied with the write word command. The voxel router supports AND, OR and XOR logical operations, and the designated logical operation is one of the supported logical operations. The address generator is further configured to respond to receiving a swap command by causing the voxel router to select which of the first and second buffer memories is to be the active memory. The address generator is further configured to respond to receiving a swap command that designates a copy operation by causing the voxel router to copy contents of the active buffer to the inactive buffer after the swap is done.

In still another aspect, the invention features a graphics memory system that includes a first buffer memory for holding data for a three-dimensional image; a second buffer memory for holding data for a three-dimensional image; a voxel router in communication with both the first and second buffer memories; and an address generator in communication with the voxel router and the first and second buffer memories. The voxel router is configured to use a selectable one of the first and second buffer memories as an active memory out of which stored image data is to be read for display on the volumetric display and to use the other of the first and second buffer memories as an inactive memory into which image data is to be written. During operation, the address generator generates addresses identifying locations within the predefined address spaces of the first and second buffer memories and is configured to respond to receiving a write voxel command by causing the voxel router to retrieve a block of data from the inactive memory, that block of data containing a value for a voxel that is identified by the write voxel command, to modify the retrieved block by modifying the value for the identified voxel within that retrieved block, and to write the modified block back to the inactive memory.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Like a computer monitor, embodiments of the invention are intended to operate connected to a host computer. The host computer performs some preprocessing of geometry information, however the rasterization and display electronics are completely contained inside the display. In the current embodiment, the display connects to the host through a SCSI-2 (wide) slave port.

In general, the volumetric display works as follows. The host computer sends image data and commands to the display system. The display system, in turn, processes this information into voxel data and stores the processed data in graphics memory until needed for display. When needed, the display system electronics then sends the image information to a projection engine which converts it to optical information by spatially modulating beams of light. Projection optics, using a projection lens and an arrangement of mirrors, directs the beams onto a revolving two-dimensional projection screen, where it forms a two-dimensional image. The two-dimensional screen rotates at about 733 RPM. The display electronics and the projection engine refresh the two-dimensional image about 5119 times per second. Each two-dimensional image forms an "image slice" of the three-dimensional volume image. At these projection and rotation rates the human visual system perceptually fuses the "image slices" into a volume-filling, three-dimensional image.

Figure 1:
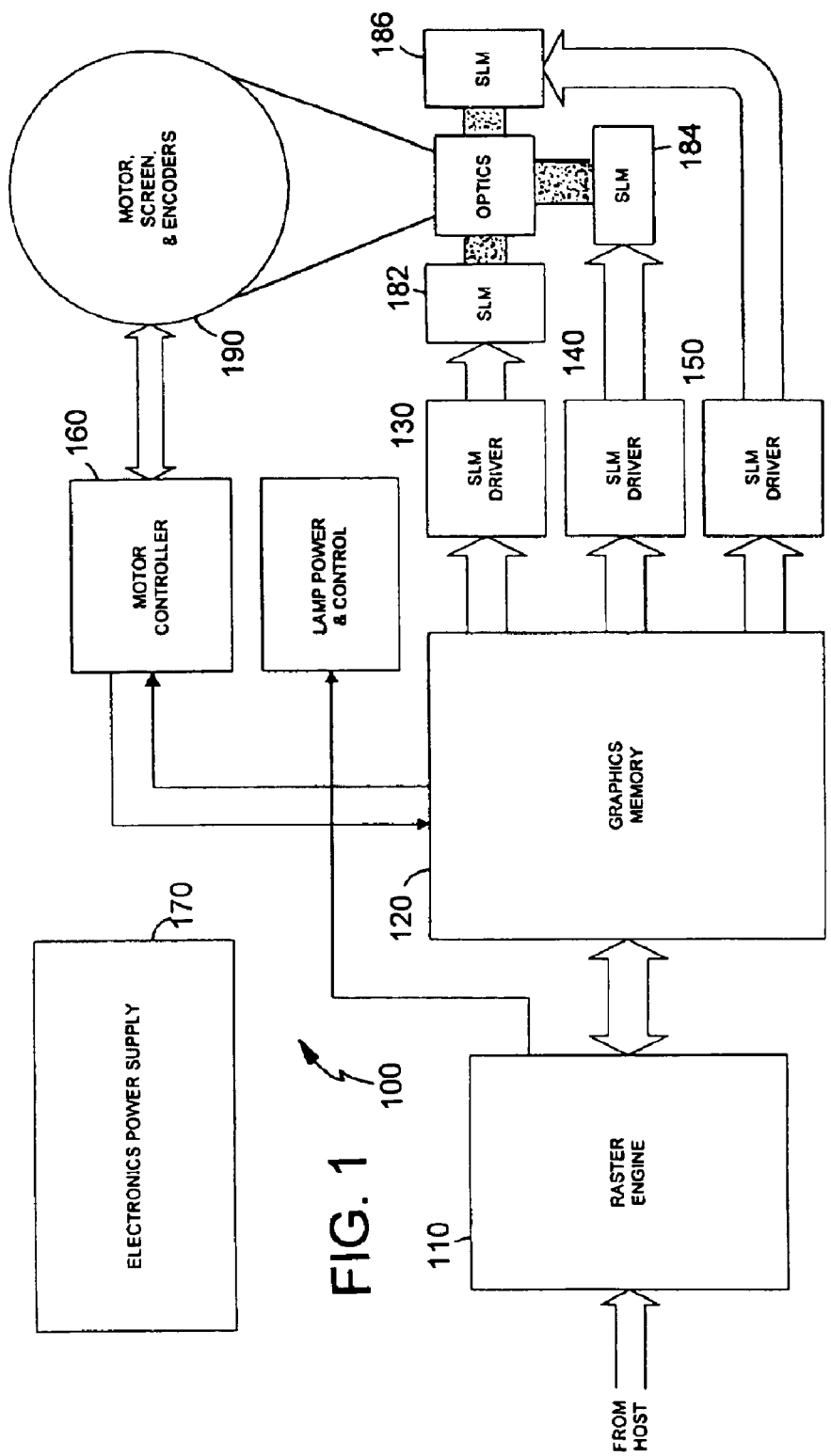
FIG. 1 is a block diagram of the electronics for a three-dimensional volumetric display system.

Referring to FIG. 1, system electronics 100 for a three-dimensional volumetric display include a raster engine 110, a graphics memory module 120, SLM drivers 130, 140 and 150, and a motor controller 160, all of which are separate custom printed circuit boards (PCBs). Raster engine 110 accepts volumetric or geometry-based 3-D data from the host computer, converts it into voxel data in the display-specific coordinate system, and writes it into graphics memory in graphics memory module 120. Graphics memory module 120 buffers an entire volume of data for continuous display of three colors in a three-dimensional volume. Electronics in SLM drivers 130, 140, and 150 converts the low-voltage TTL data and control signals into the analog & digital signals needed to operate each Spatial Light Modulators (SLM) 182, 184, and 186. SLMs 182, 184, and 186 modulate the red, green and blue components of a light beam to generate a colored image. This image is projected, through optics 180, onto a screen 190, which is rapidly rotated by a motor. Motor controller 160 locks the screen rotation speed and position to the volume scanning signals. System electronics 100 also includes an electronics power supply 170. All of the parts shown are contained within a display enclosure.

Raster engine 110 and graphics memory module 120 are divided through a high-speed, parallel interface with a small number of control and clock signals. Graphics memory module 120 directs motor controller 160 through a small number of low to medium speed digital signals over a small cable with discrete wires. Each of SLM drivers 130, 140, and 150 is connected to graphics memory module 120 through a high-speed, parallel interface.

Figure 2:
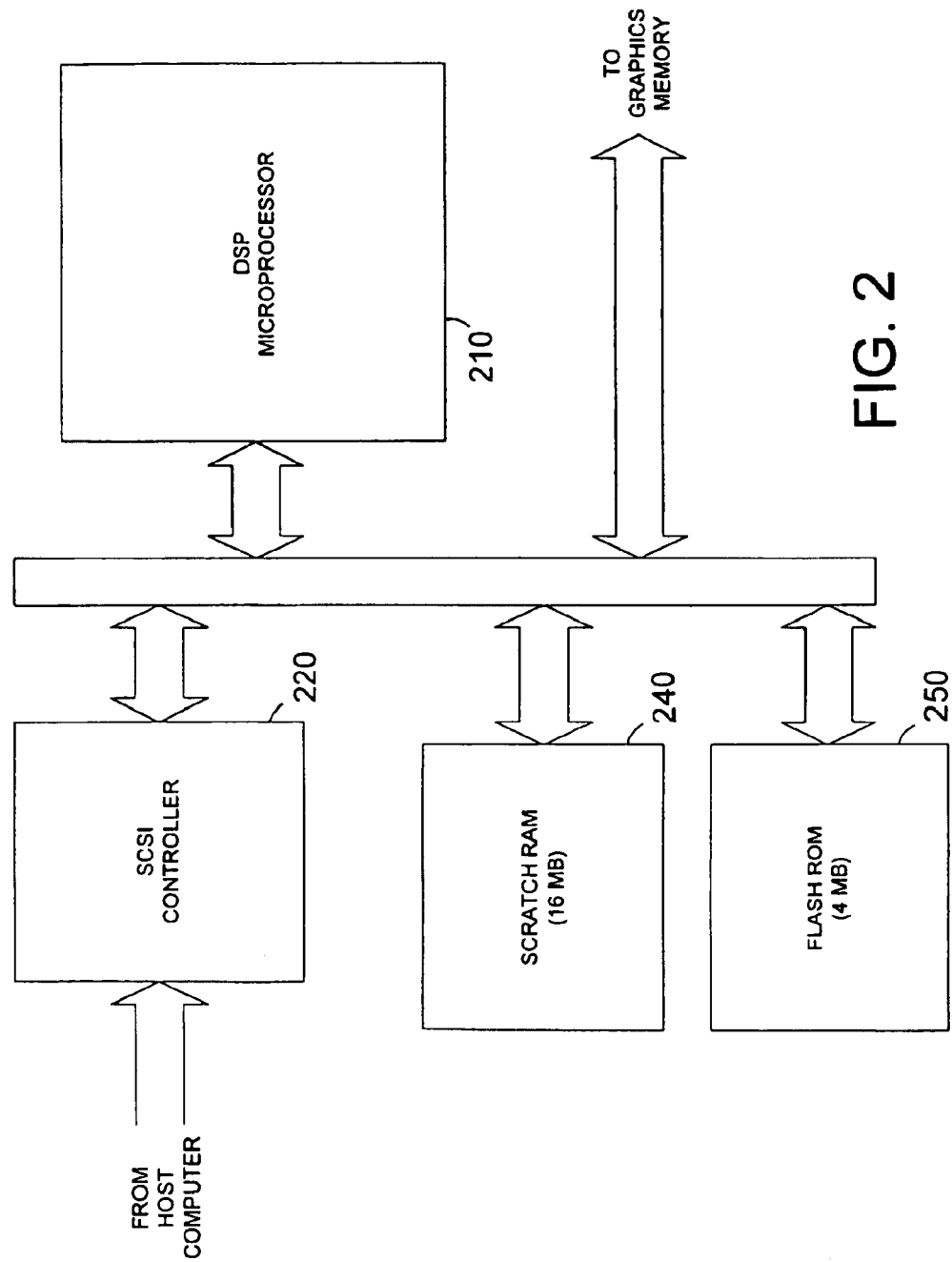
FIG. 2 shows the architecture of the raster engine that is part of the volumetric display system of FIG. 1.

Referring to FIG. 2, raster engine 110 contains a single, powerful digital signal processing (DSP) microprocessor 210 with external memory, a SCSI controller 220, some interface switches, and a port to graphics memory module 120 (see FIG. 1). High-speed routines and critical data are expected to use the CPU's internal cache.

Program microcode and tables are contained within of Flash ROM 250 that resides at the boot address permitting the device to operate without connection to a host computer. The program microcode and tables in Flash ROM 250 can be reprogrammed using the SCSI interface providing for field upgrades.

A Scratch RAM 240, which is 16 MB of Synchronous DRAM, is also supported by the CPU. This memory is used for the geometry buffer and storage of variables that do not fit in the internal cache.

Referring again to FIG. 1, due to the CPU's addressable memory limit, access to the graphics memory module 120 is provided with a series of 32-bit ports. The ports and the functions of graphics memory module 120 are implemented with a series of FPGA's, which are un-programmed at boot time. As a result, the CPU programs the devices through the ports.

Figure 3:
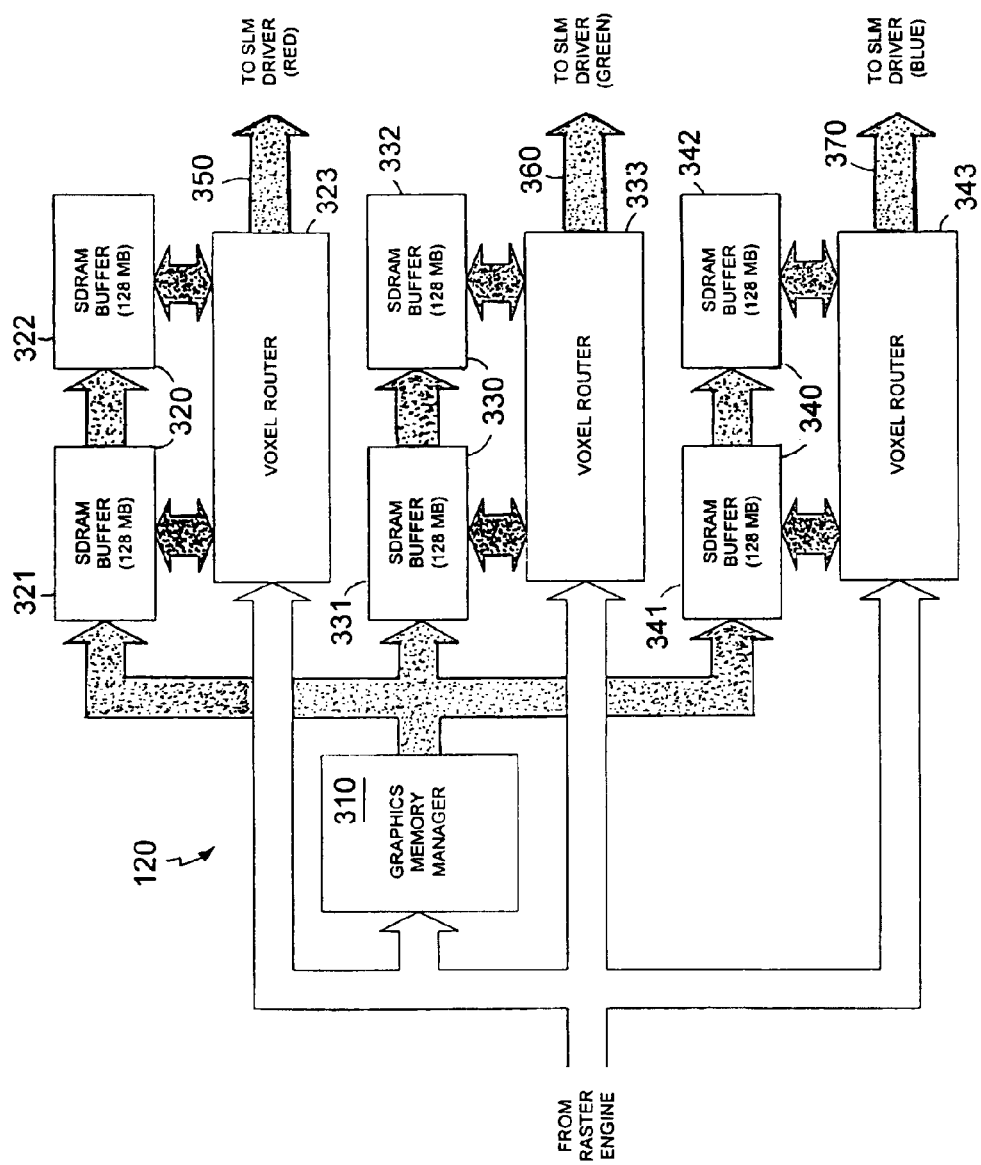
FIG. 3 shows the architecture of the graphics memory module that is part of the volumetric display system of FIG. 1.

Referring to FIG. 3, graphics memory module 120 includes an address generator 310, three identical sets of graphics memory, 320, 330, and 340, and an interface 350, 360, and 370, to each SLM driver 130, 140, and 150 (see FIG. 1), respectively. Each set of graphics memory stores a full volume of voxel data for a corresponding one of the red, green, or blue portions of the three-dimensional volumetric image that is to be displayed.

Each set of graphics memory 320, 330, and 340 includes two buffers 321 and 322, 331 and 332, and 341 and 342, and a voxel router 323, 333, and 343, respectively. Voxel routers 323, 333, and 343 route data between raster engine 110 (see FIG. 1), each of buffers 321 and 322, 331 and 332, and 341 and 342, and the SLM drivers. Each of voxel router 323, 333, and 343, which is basically a large switching device that routes data into and out of the memory, is also capable of executing a few simple logic functions between data from raster engine 110 and data in the buffers. The raster engine writes to the voxel routers as though they were inside of memory and the voxel routers then make the required changes in the appropriate one of the buffers.

The two buffers within a set of graphics memory are completely independent with separate address and data buses to allow CPU access to one set while the other set is being displayed. The two buffers have the same address spaces, so that the software need not apply any offset depending on what memory buffer is being written to. Indeed, the software would typically not need to know what buffer is active and what buffer is not active. This, coupled with the presence of the voxel routers, enables the use of standard, single-ported memory for the buffers, instead of dual ported memory. In this embodiment, the buffers are implemented by Double Data Rate (DDR) SDRAMs. These are single ported memories, commonly available memory modules such as are typically found in PCs and thus are relatively inexpensive in comparison to dual ported memories that might typically be sued in graphics memory. In addition, their use as buffer memory helps maximize achievable transfer speeds between the buffers and the voxel routers.

Raster engine 110 writes graphics memory commands to address generator 310 and writes graphics data to voxel routers 323, 333, and 343. The raster engine ports on each voxel router and the address generator have a FIFO interface.

Address generator 310, which is the primary interface between the CPU and the graphics memory, contains the state machines that control graphics memory and the screen motor. Address generator 310 controls the operation of all three sets of graphics memory including initialization, address generation, and auto-refresh of the DDR SDRAMs in each buffer. It also generates the addresses for the bursting accesses to the buffers; it controls the bursting of data out of those memories to the SLM to be displayed; and it generates the addresses for the random accesses performed by the CPU.

Commands received from raster engine 110 are queued, interpreted, and executed by address generator 310. Address generator 310 transforms the commands into series of simple operations, which are performed by the address generator and voxel routers. In other words, address generator 310 interprets commands, generates the appropriate addresses, controls the buffer memories, sets proper order for executing steps of command as well as establishes the order and timing of the instructions sent to the voxel routers for manipulating the data in the memory buffers. It acts as a master control unit.

Referring again to FIG. 3, voxel router 323 routes voxel data between four locations: raster engine 110 (see FIG. 1), buffer "A", buffer "B", and a SLM formatter. The general flow for data in voxel router 323 is from raster engine 110 to a SLM formatter, with interim storage in the SDRAM buffers. Voxel router 323 can also apply some logic functions to data being moved through the router.

During operation, one of the two SDRAM buffers is the "active" buffer, and one is the "inactive" buffer. The active buffer is in an almost continual state of bursting sequential data to the SLM at a rate of about 7.5 ns per voxel. The inactive buffer is available for random access from raster engine 110. Voxels can be written to and read from the inactive buffer. Also, the voxel routers perform simple masking functions and execute read-modify-write access with simple logic functions such as ANDs, ORs, and exclusive-ORs, which are widely used for graphics computation. Performing these functions in the voxel routers greatly reduces the computational load on raster engine 110.

Once the raster engine completes drawing voxels in the "inactive" buffer, a command from the raster engine instructs the voxel router to swap the functions of the buffers so that the inactive buffer becomes the active buffer and vice versa. There are three options available to the raster engine software when the buffers are swapped. The data in the new inactive buffer can: (1) remain as it was when it was active; (2) be cleared out; or (3) be copied from the new active buffer into the inactive buffer. This feature dramatically reduces the computation necessary for each new volume. The copying and clearing functions are accomplished during the first full scan of the active buffer; they are done at burst speed concurrent with the reading out and the sending of the image data to the display.

Address generator 310 recognizes and implements a set of commands among which are the following: copy/clear buffer; swap buffers; write voxel; and write word. Raster engine 110 uses these commands to write the image data into the memory buffers in preparation for displaying the images through the display device. Raster engine 110 sends these commands to the address generator 310, which in turn causes the voxel routers to perform the precise sequence of steps that are necessary to implement the command. Each of these will now be described in greater detail.

The copy/clear buffer command either causes the address generator to perform a copy or a clear of the inactive buffer, depending on which bit is set within the command. If the clear bit is set, then the address generator causes the voxel router to clear the inactive buffer, which is done at burst speed. The clear operation prepares the inactive buffer for writing an entirely new volume of image data to it. The clear command might typically be used when the raster engine is drawing into the inactive buffer and while that is taking place, the application supplies an entirely new volume of image data to the raster engine. At that point, there is no need to continue writing the old image to the inactive buffer so the inactive buffer is simply cleared and the raster engine starts writing the new image data to that buffer.

If the copy bit is set, the address generator causes the voxel router to copy the contents of the active buffer into the inactive buffer, and this is also done at burst speed concurrently with as the voxel router reading out the image data from the active buffer and sending it to the SLM.

When either a copy or a clear is taking place, the address generator sends the same addresses to both buffers.

The swap buffer command causes the address generator to swap the inactive buffer and the active buffer so that the old inactive buffer becomes the new active buffer and the old active buffer becomes the new inactive buffer. This command has three options, namely, copy, clear and do nothing.

A cursor movement provides a good examples of how one might use one of the copy commands. If the only thing that has changed is the location of the cursor (i.e., the image has remained the same), it is not necessary to redraw the entire image. Rather, the previous image is copied into the inactive buffer and then the appropriate write commands are used to erase the old cursor and draw a new one.

The write word command is one of the read/modify/write commands. This command causes voxel router, again under direct control of the address generator, to read out a specified 32-bit word from the inactive buffer, perform an indicated operation on that old word and the new word, and then write the results back into the inactive buffer. The operations that the voxel router can perform include AND, OR and XOR. That is, depending on which operation is indicated, the voxel router will combine the old word and the new word using one of those operations and then write the results back to the inactive buffer. It is also possible to specify no operation, in which case the new word is simply written to the appropriate location in the inactive buffer without reading out the old word first.

The write voxel command is similar to the write word command except that it operates on the bit level to change a specified voxel. This command causes voxel router, to read out from the inactive buffer the 32-bit word that contains the target voxel, to perform an indicated operation on that voxel, and then write the resulting word back into the inactive buffer. Again, the operations that the voxel router can perform on the voxel include AND, OR and XOR. It is also possible to specify no operation, in which case the new voxel is simply written to the appropriate location in the 32-bit word and the results are written back to the inactive buffer. The raster engine uses the write voxel command most often to draw the contents of the image volume to the inactive buffer.

Figure 4:
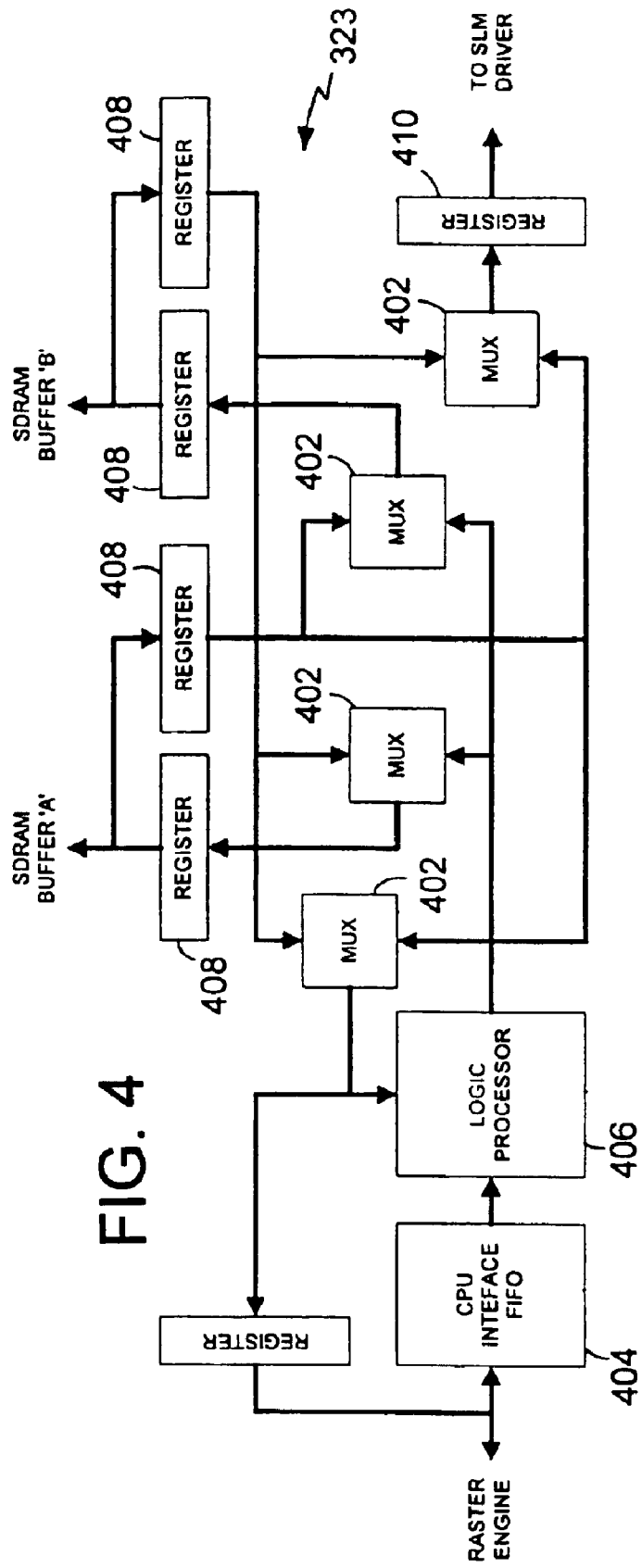
FIG. 4 shows the architecture of the voxel routers that are part of the volumetric display system of FIG. 1.

Referring to FIG. 4, voxel router 400 includes at its input end a CPU interface FIFO 404 and a logic processor 406. FIFO 404 enables the voxel router to receive and store a sequence of commands that are to be executed. Logic processor provides the functionality that is required to implement the write voxel and write word commands and the option logic operations that are allowed in those commands. Voxel router 323 also includes an array of switches (i.e., MUXs 402) that perform the function of routing the data into and out of the SDRAMs (i.e., buffers "A" and "B"). Registers 408 interface those MUXs 402 to buffers "A" and "B". Registers 408 are holding registers that are used for pipelining of data transfers into and out of the buffer memories.

The voxel routers and the address generator are implemented in Field Programmable Gate Arrays (FPGAs), which must be programmed every time the hardware is powered up.

Each buffer has 128 MB of storage, which includes of four 256 Mbit DDR SDRAMs. In other embodiments, graphics memory module 120 supports 128 Mbit parts with additional population sites. The FPGA program for the address generator is slightly varied to support the two variations in population. In fact, populations of all sites with 256 Mbit or possibly 512 Mbit parts can be accomplished, doubling or quadrupling the capacity, with just minor changes to the FPGA.

Voxel router 400 is operated in lock-step with address generator 310 (see FIG. 3). This is accomplished with a 66.6667 MHz clock that is buffered with zero delay buffers and fed to each FPGA. This clock is doubled to 133 MHz in each FPGA to control the DDR feature of the SDRAMs in buffers "A" and "B". The delay locked loops (DLL) in the FPGAs use external pins for feedback to ensure that the buffer delays and external loading of each clock output is compensated for.

Referring back to FIG. 1, motor controller 160 takes a clock input from graphics memory module 120 and synchronizes the screen rate to the clock using encoders on the screen/motor assembly as feedback.

A number of embodiments of the invention have been described. Nevertheless, it will be understood that various modifications may be made without departing from the spirit and scope of the invention. For example, instead of using a single address generator, one could use a separate address generator for each voxel router and put the electronics on the same chip or board. Accordingly, other embodiments are within the scope of the following claims.

What is claimed is:

1. A graphics memory system for a volumetric display that displays volumetric images, said system comprising:

a first buffer memory for holding data for a three-dimensional image;

a second buffer memory for holding data for a three-dimensional image;

a voxel router in communication with both the first and second buffer memories, said voxel router being configured to use a selectable one of said first and second buffer memories as an active memory out of which stored image data is to be read for display on the volumetric display and to use the other of said first and second buffer memories as an inactive memory into which image data is to be written; and an address generator in communication with the voxel router and the first and second buffer memories, said address generator during operation generating addresses identifying locations within the predefined address spaces of the first and second buffer memories and being configured to respond to receiving a write block command by causing the voxel router to write new data to a 32-bit block within the inactive memory at a location that is identified by an address supplied by the address generator;

wherein the address generator is further configured to respond to receiving said write block command by causing the voxel router to retrieve data that is stored in the identified block of inactive memory, to modify the retrieved data, and to write the modified data back to said inactive memory as said new data.

2. The graphics memory system of claim 1 wherein the voxel router is further configured to modify the retrieved data by using a designated logical operation to combine the retrieved data with data supplied with the write word command.

3. The graphics memory system of claim 1 wherein the voxel router supports AND, OR and XOR logical operations, and wherein said designated logical operation is one of the supported logical operations.

4. A graphics memory system for managing image data for a volumetric display that displays volumetric images, said system comprising:

a first buffer memory for holding data for a three-dimensional image;

a second buffer memory for holding data for a three-dimensional image;

a voxel router in communication with both the first and second buffer memories, said voxel router being configured to use a selectable one of said first and second buffer memories as an active memory out of which stored image data is to be read for display on the volumetric display and to use the other of said first and second buffer memories as an inactive memory into which image data is to be written; and an address generator in communication with the voxel router and the first and second buffer memories, said address generator during operation generating addresses identifying locations within the predefined address spaces of the first and second buffer memories and being configured to respond to receiving a write block command by causing the voxel router to write new data to a block within the inactive memory at a location that is identified by an address supplied by the address generator, wherein the address generator is further configured to respond to receiving a swap command by causing the voxel router to select which of said first and second buffer memories is to be the active memory.

5. The graphics memory system of claim 4 wherein the swap command designates a copy and the address generator is further configured to respond to receiving the swap command by causing the voxel router to copy contents of the active buffer to the inactive buffer.

6. A graphics memory system for managing image data for a volumetric display that displays volumetric images, said system comprising:

a first buffer memory for holding data for a three-dimensional image;

a second buffer memory for holding data for a three-dimensional image;

a voxel router in communication with both the first and second buffer memories, said voxel router being configured to use a selectable one of said first and second buffer memories as an active memory out of which stored image data is to be read for display on the volumetric display and to use the other of said first and second buffer memories as an inactive memory into which image data is to be written; and an address generator in communication with the voxel router and the first and second buffer memories, said address generator during operation generating addresses identifying locations within the predefined address spaces of the first and second buffer memories and being configured to respond to receiving a write voxel command by causing the voxel router to retrieve a block of data from the inactive memory, said block of data containing a value for a voxel that is identified by the write voxel command, to modify the retrieved block by modifying the value for the identified voxel within that retrieved block, and to write the modified block back to said inactive memory.

7. The graphics memory system of claim 6 wherein said block is a 32-bit word.

8. The graphics memory system of claim 7 wherein the voxel router is further configured to modify the retrieved data by using a designated logical operation to modify the one voxel designated by the write voxel command in the retrieved data word while preserving the remaining voxels in the retrieved data word.

9. The graphics memory system of claim 8 wherein the voxel router supports AND, OR and XOR logical operations on the one designated voxel, and wherein said designated logical operation is one the supported logical operations.

* * * * *